United States Patent
Goode

(10) Patent No.: US 10,435,158 B2
(45) Date of Patent: Oct. 8, 2019

(54) AIRCRAFT PASSENGER SEATING ARRANGEMENT

(71) Applicant: British Airways Plc, Harmondsworth, West Drayton (GB)

(72) Inventor: Nigel Goode, London (GB)

(73) Assignee: British Airways Plc, Harmondsworth, West Drayton (GB)

(*) Notice: Subject to any disclaimer, the term of this patent is extended or adjusted under 35 U.S.C. 154(b) by 420 days.

(21) Appl. No.: 15/110,092

(22) PCT Filed: Jul. 9, 2014

(86) PCT No.: PCT/GB2014/052087
§ 371 (c)(1),
(2) Date: Jul. 6, 2016

(87) PCT Pub. No.: WO2015/104527
PCT Pub. Date: Jul. 16, 2015

(65) Prior Publication Data
US 2016/0332734 A1  Nov. 17, 2016

(30) Foreign Application Priority Data

Jan. 7, 2014  (GB) .................................. 1400219.0
May 19, 2014  (GB) .................................. 1408877.7

(51) Int. Cl.
*B64D 11/06*  (2006.01)

(52) U.S. Cl.
CPC .......... *B64D 11/0693* (2013.01); *B64D 11/06* (2013.01); *B64D 11/0601* (2014.12);
(Continued)

(58) Field of Classification Search
CPC ............ B64D 11/0693; B64D 11/0606; B64D 11/0604; B64D 11/0624; B64D 11/0638;
(Continued)

(56) References Cited

U.S. PATENT DOCUMENTS 3,632,161 A * 1/1972 Arfaras .................... A47C 7/70
297/145
6,398,164 B1   6/2002 Fasse
(Continued)

FOREIGN PATENT DOCUMENTS

EP   1 707 486 A1   10/2006
EP   2 703 215 A2   3/2014
(Continued)

OTHER PUBLICATIONS

UK Intellectual Property Office, Further Search Report under Section 17, Application No. GB1614380.2, British Airways Plc, Oct. 30/31, 2017, 3 pages.

*Primary Examiner* — Milton Nelson, Jr.
(74) *Attorney, Agent, or Firm* — Sterne, Kessler, Goldstein & Fox P.L.L.C.

(57) ABSTRACT

A aircraft passenger seating arrangement comprises a seat (1), a secondary surface (4) spaced to one side of the seat (1), in a direction substantially parallel to the width of the seat; and an infill surface (3) deployable into a space between the seat (1) and the secondary surface (4) so as to form a substantially continuous sleeping surface along the secondary surface (4), the infill surface (3) and the width of the seat (1).

27 Claims, 20 Drawing Sheets

(52) U.S. Cl.
CPC .......... *B64D 11/062* (2014.12); *B64D 11/064* (2014.12); *B64D 11/0604* (2014.12); *B64D 11/0606* (2014.12); *B64D 11/0624* (2014.12); *B64D 11/0636* (2014.12); *B64D 11/0638* (2014.12); *B64D 11/0641* (2014.12); *B64D 11/0643* (2014.12); *B64D 11/0647* (2014.12); *B64D 11/06395* (2014.12)

(58) Field of Classification Search
CPC . B64D 11/0601; B64D 11/064; B64D 11/062; B64D 11/0641; B64D 11/06
USPC .................. 297/118, 243, 173; 244/118.6
See application file for complete search history.

(56) References Cited

U.S. PATENT DOCUMENTS

| | | | | |
|---|---|---|---|---|
| 7,261,266 B2 * | 8/2007 | Satterfield | ........... | B60R 11/0235 248/284.1 |
| 7,770,845 B2 | 8/2010 | Saint-Jalmes et al. | | |
| 7,997,531 B2 * | 8/2011 | Bettell | ................ | B64D 11/064 244/118.6 |
| 8,678,311 B2 * | 3/2014 | Cheung | ................ | B64D 11/00 244/118.6 |
| 2014/0110981 A1 | 4/2014 | Hasegawa et al. | | |
| 2014/0159440 A1 * | 6/2014 | Porter | .................... | B60N 2/01 297/163 |

FOREIGN PATENT DOCUMENTS

| | | |
|---|---|---|
| FR | 2 935 683 A1 | 9/2010 |
| GB | 2 438 162 A | 11/2007 |
| GB | 2469180 A | 10/2010 |
| JP | 2000-264109 A | 9/2000 |
| WO | WO 2006/054064 A1 | 5/2006 |
| WO | WO 2006/054104 A1 | 5/2006 |
| WO | WO 2007/061381 A1 | 5/2007 |
| WO | WO 2008/046027 A1 | 4/2008 |
| WO | WO 2010/086785 A1 | 8/2010 |

* cited by examiner

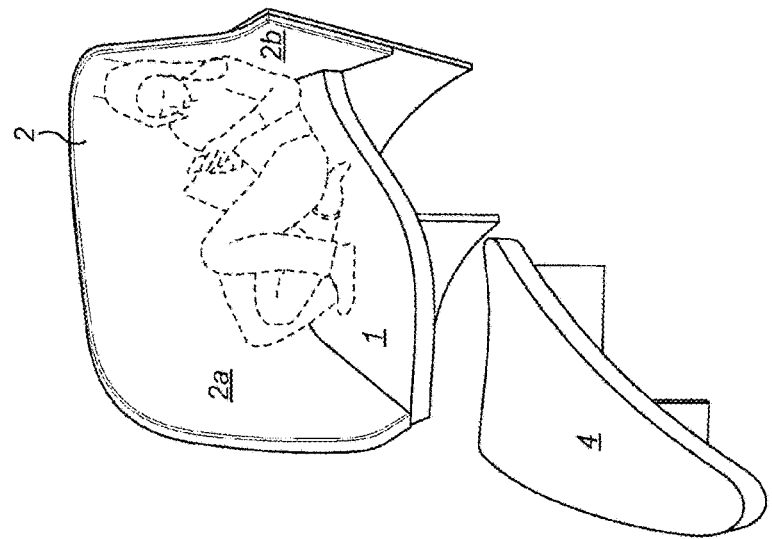
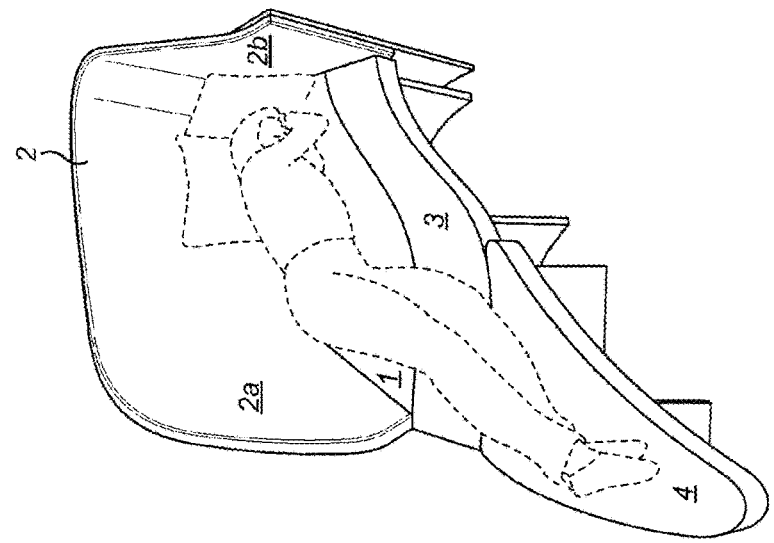
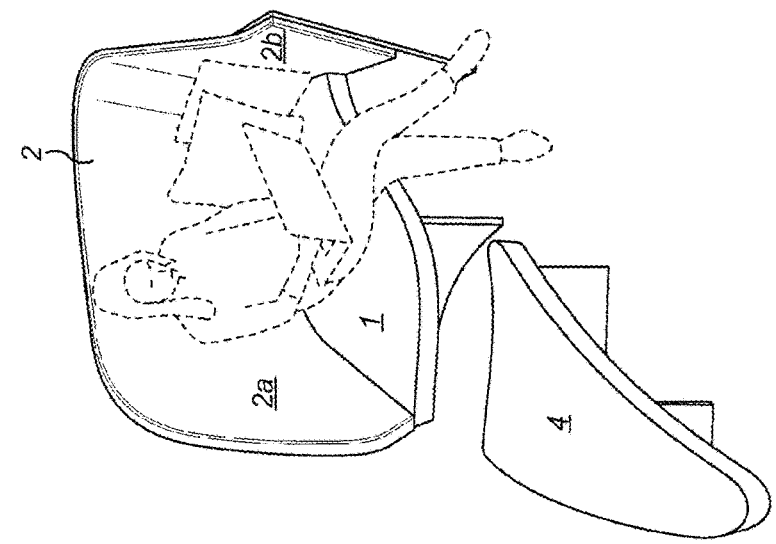

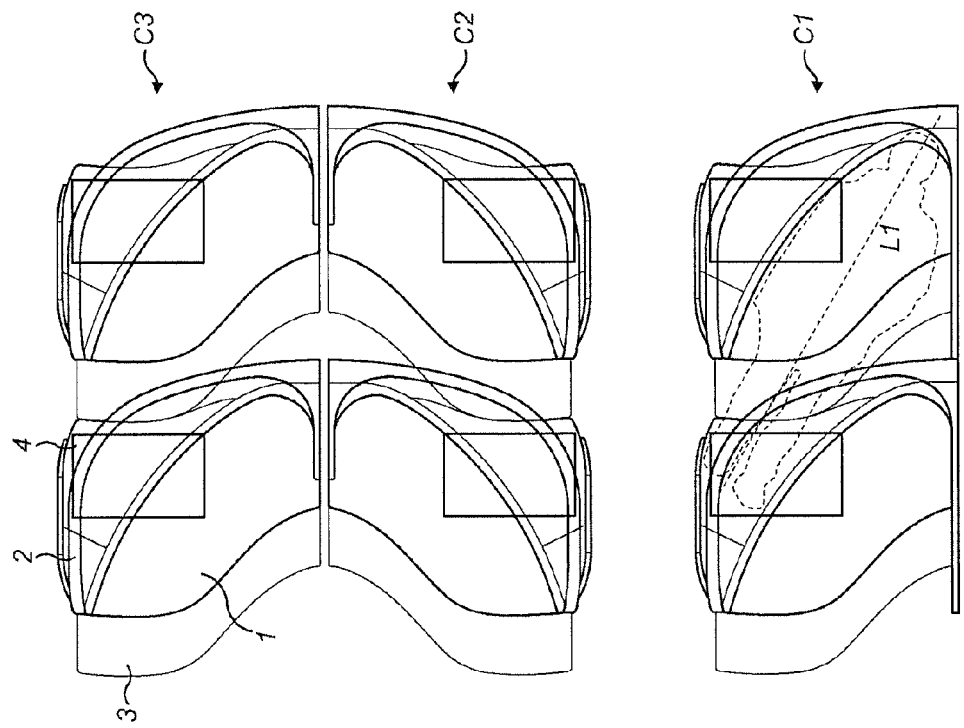
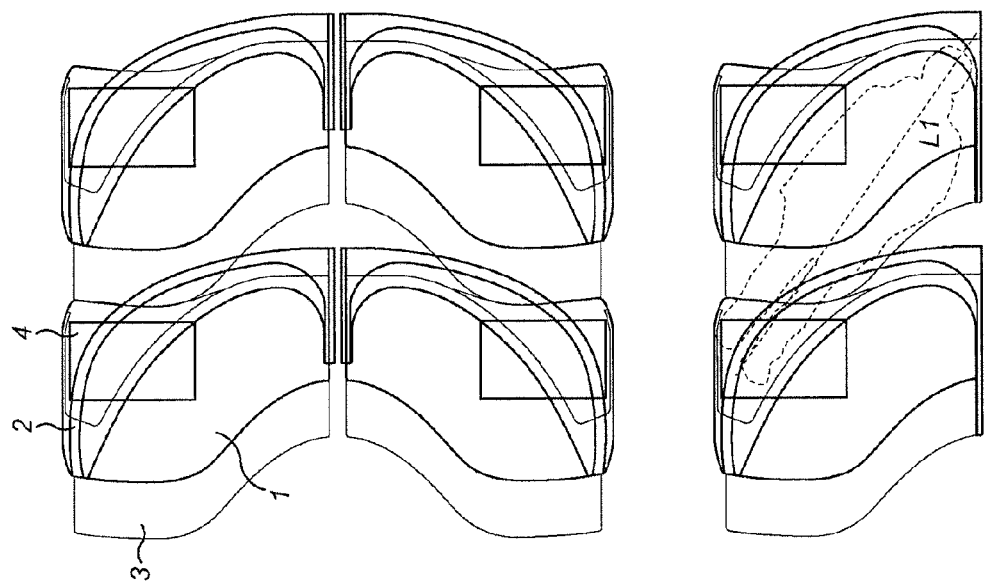
FIG. 6b
FIG. 6a

AIRCRAFT PASSENGER SEATING ARRANGEMENT

The present invention relates to an aircraft passenger seating arrangement, to an array of such seating arrangements, and to an aircraft cabin including such an array.

BACKGROUND TO THE INVENTION

Examples of prior art aircraft sleeper seats are disclosed in the applicant's patent publications WO-A-9618537, WO-A-0021831, WO-A-2007/072045, WO-A-2007/135373 and WO-A-2009/066054, embodiments of which include current and previous versions of the British Airways® First and Club World® seats. These seats can be converted into a flat, horizontal bed, and have enjoyed great commercial success. However, there is intense competition to provide ever-greater comfort and space for aircraft passengers.

Passenger seats for aircraft are subject to stringent design constraints, many of which are not applicable to seats for other vehicle types. One problem is the need to meet the relevant safety standards for aircraft passenger seats, such as the 16 g test that requires seats to survive deceleration of 16 g in a takeoff/landing position. Another problem is the need to minimize the weight of the seat, since carrying extra weight on an aircraft increases fuel consumption and therefore monetary and environmental cost. Hence, the seat must be both strong and light.

Most if not all commercially available 'lie-flat' aircraft passenger seats, that allow a passenger to lie in a flat and preferably horizontal position for sleeping, include a reclining mechanism that allows the seat back to move between substantially upright and horizontal positions, driven by one or more drive motors. Typically, the mechanism also allows the seat pan to move horizontally and/or to rotate. The mechanism and drive motor(s) add considerably to the weight and cost of the seat.

Another problem relates to the use of space. Any given aircraft cabin has a maximum area available for passenger seating, which must be used in the most space-efficient manner possible so as to maximize the seating area and legroom available to each passenger, while allowing unimpeded exit from the seat. It is also desirable for cost reasons to fit as many passenger seats as possible in the available area, without sacrificing passenger comfort and convenience.

Another problem relates to the level of comfort of the seat. Aircraft passenger seats may be used for day flights, in which the passenger will want to work, eat and/or relax, and night flights during which the passenger will want to sleep. Preferably, an aircraft passenger seat should allow a passenger to adopt comfortable positions for all of these activities. Most if not all commercially available aircraft passenger seats constrain the seating or lying positions available to the passenger, and do not easily allow the seating space to be shared with other passengers.

Another problem relates to the psychological and/or social needs of aircraft passengers, who may desire privacy while working, eating or sleeping, or may wish to interact with a travelling companion.

Another problem relates to aircraft passengers of above average width; conventional aircraft passenger seats are constrained in width, so that such passengers are compelled to occupy two adjacent seats, with the intermediate armrest stowed. This wastes space, and usually money since the passenger must pay for both seats.

Another problem relates to the tray tables that are usually provided in aircraft passenger seating, as a work or eating surface. The tray table is normally positioned in front of the user, and cabin crew are required to lean over from the aisle to the tray table position in order to serve meals, which is inconvenient for the cabin crew and obtrusive for the passenger.

Another problem relates to the amount of personal storage space available to the aircraft passenger. Conventionally, much of the space under or around an individual seat is taken up by reclining mechanisms, or needs to be kept clear to allow movement of the seat, so cannot be used for storage.

STATEMENT OF THE INVENTION

According to the present invention, there is provided an aircraft passenger seating arrangement comprising a seat, a secondary surface spaced to one side of the seat, in a direction substantially parallel to the width of the seat; and an infill surface deployable into a space between the seat and the secondary surface so as to form a substantially continuous sleeping surface along the secondary surface, the infill surface and the width of the seat. Preferably, the seat has a width substantially greater than its depth.

Aspects of the invention include an array of such passenger seating arrangements, the array comprising at least one column of said seating arrangements aligned along a longitudinal direction, such that the seat of each seating arrangement in the column faces at substantially the same seating angle to the longitudinal direction.

BRIEF DESCRIPTION OF THE DRAWINGS

Embodiments of the invention will now be described with reference to the drawings identified below.

FIGS. 1a to 1c are perspective views of an aircraft passenger seating arrangement in a first embodiment of the present invention, when used for sitting, sleeping and relaxing respectively.

FIGS. 6a and 6b are schematic plan views of alternative arrays of aircraft passenger seats of the second embodiment, configured for different aircraft cabins.

DETAILED DESCRIPTION OF THE EMBODIMENTS

Terminology and References

Figure 2A:
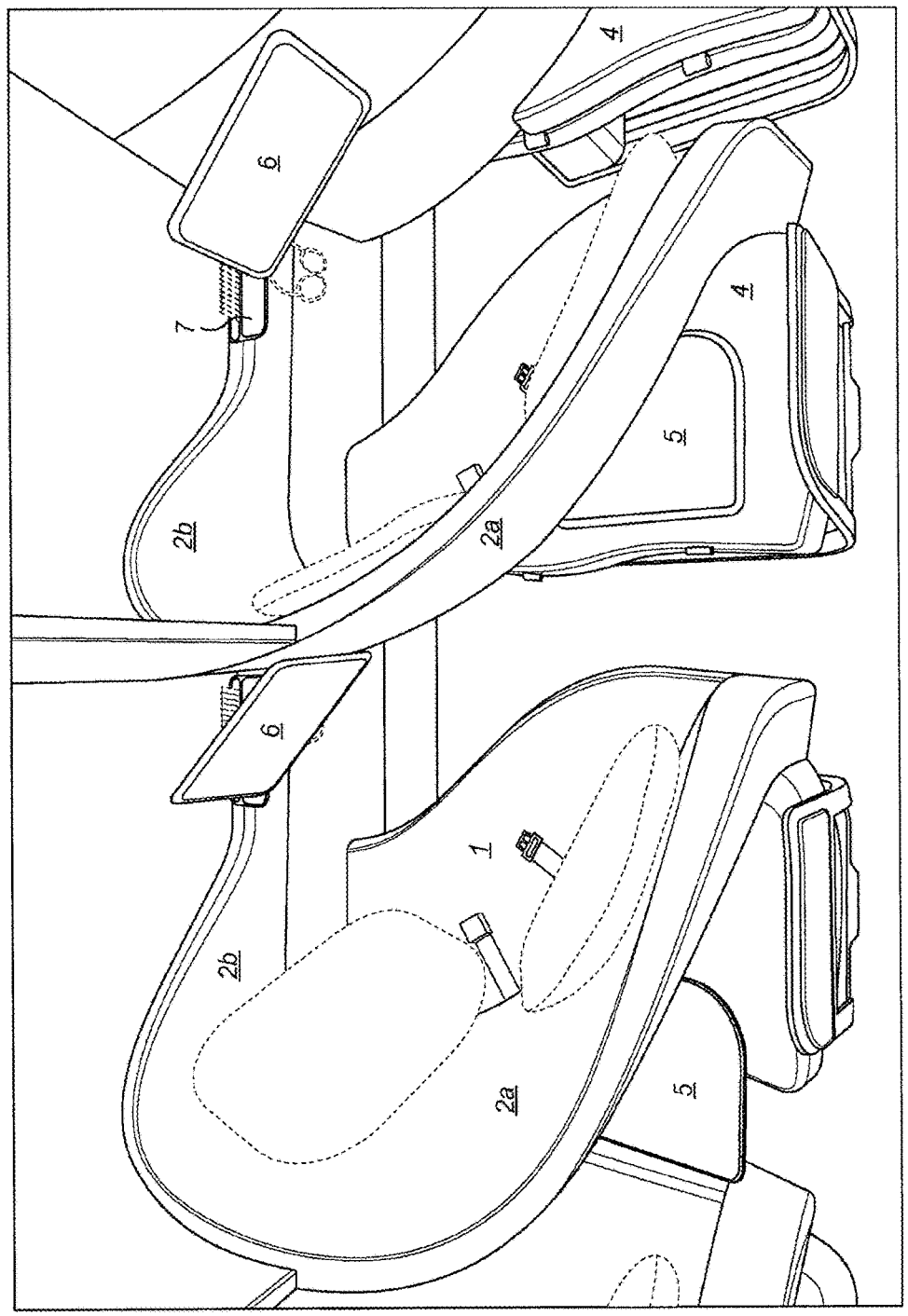
FIGS. 2a to 2g are perspective views of an aircraft passenger seating arrangement in a second embodiment of the present invention, in the following configurations: vacant, TTL (Taxi, Takeoff and Landing), work, rest/sleep, relax, service, and dining.
Figure 2B:
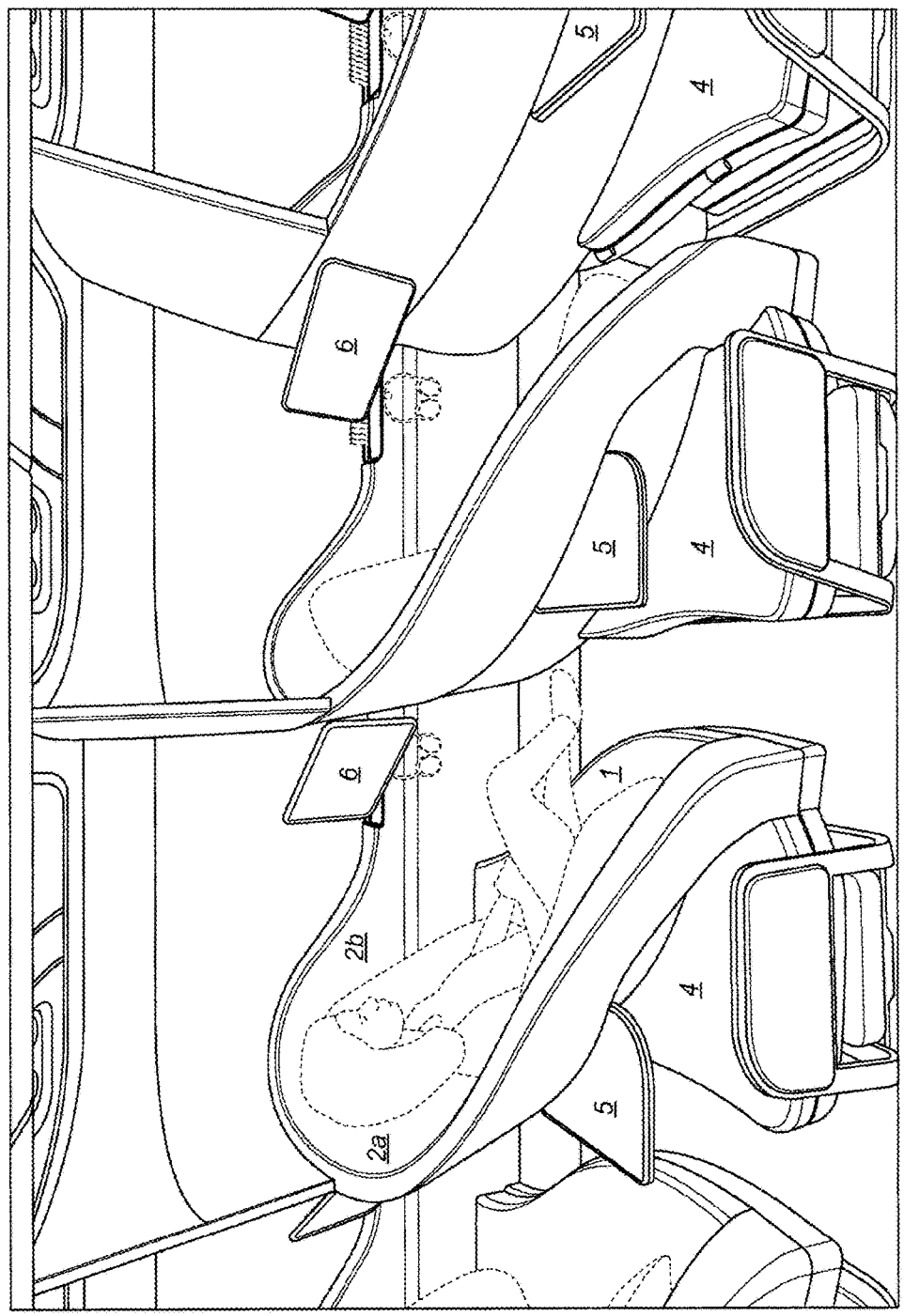

In describing the embodiments, 'horizontal' and 'vertical' are defined with reference to the floor of the passenger seating area of the aircraft. As is well known in the art, the angle of the floor relative to the gravitational horizontal is determined by the pitch of the aircraft, which is about 15° during takeoff and landing, and about 3° in level flight. When describing an individual seating arrangement, 'forward', 'rearward', 'front' and 'rear' are defined with reference to the longitudinal axis and direction of the aircraft cabin. 'Inward' and 'outward' directions are defined with reference to a central longitudinal axis of the cabin. The width of the seat is taken to be the distance across the seat, for example between the farthest points to the left and right of the passenger when sitting on the seat. The depth of the seat is taken to be the distance from the front of the seat to the back of the seat with reference to the direction in which the passenger normally sits.

Similar parts between different embodiments are indicated by the same reference numerals, and their description is not necessarily repeated for each embodiment.

Seating Arrangement—First Embodiment

As shown in FIGS. 1a to 1c, an aircraft passenger seating arrangement in a first embodiment of the present invention comprises the following main components: a seat 1, a seat housing or shell 2 surrounding the seat 1, a secondary surface 4 spaced to one side of the seat 1, and an infill member or surface 3 that can be deployed to fill the space between the secondary surface 4 and the seat 1 as shown in FIG. 1b, or stowed in the configurations shown in FIGS. 1a and 1c. The space between the seat 1 and the secondary surface 4 provides access to the seat 1 from an aisle.

The shell 2 provides a seat back 2a behind the seat 1 and a side wall 2b against which the passenger may rest as shown in FIGS. 1a and 1c. The shell 2 may be fixed relative to the seat 1, and preferably no reclining mechanism is provided. The seat 1 and shell 2 may be fixed to the cabin floor, either as separate components or as a combined structure.

The seat 1 provides a continuous seating surface substantially wider than a conventional aircraft passenger seat, and substantially wider than its depth. The width of the seat 1 may be for example 2.5 to 4 times the hip width of the average airline passenger e.g. between approximately 40 and 60 inches or 1 and 1.5 meters. This allows 2-3 passengers of average size or smaller to sit together, in the manner of a sofa or bench, and also allows a passenger of above average size to sit in comfort. It also allows a passenger to recline along the width of the seat. The depth of the seat 1 is designed to allow the average adult to sit comfortably, resting on the seat back 2a, and is typically 20-30 inches (0.5-0.75 meters).

The seat 1 faces at an angle of approximately 30-60° to the forward direction, while the side wall 2b is substantially parallel to the forward direction. The depth of the seat 1 tapers in the direction towards the secondary surface 4, and is widest towards the side wall 2b.

The upper surface of the secondary surface 4 is substantially coplanar with the upper surface of the seat 1, and is also substantially coplanar with the upper surface of the infill surface 3 when deployed as shown in FIG. 1b, so that the upper surfaces of the seat 1, infill surface 3 and secondary surface 4 form a substantially flat sleeping surface. Preferably, the sleeping surface is substantially horizontal. The sleeping surface extends at an angle of approximately 20-50° to the forward direction. The secondary surface 4 tapers in width in a direction away from the seat 1. The secondary surface 4 may also be usable as a foot/leg rest for the passenger in the seat 1, as a table, or as a seat for a visitor.

The infill surface 3, when deployed, extends close to or in contact with the front end of the seat 1 along substantially the full width of the seat 1, and substantially fills the gap or space between the seat 1 and the secondary surface 4 so as to provide a substantially continuous surface therebetween. Hence, the infill surface 3 serves to widen the sleeping surface around the upper body of the passenger on the seat 1, and to allow the sleeping surface to extend between the seat 1 and the secondary surface 4. In alternative embodiments, the infill surface 3 may perform only one of these functions, or discrete infill surfaces may be provided to perform each function.

Preferably, the infill surface 3 is stowable under the seat 1, and may include a deployment mechanism for sliding and/or pivoting the infill surface 3 from under the seat 1 into the deployed position. The infill surface 3 may be attached to the secondary surface 4 in the deployed position, for stability, or may be cantilevered from the seat 1. In another alternative, the infill surface 3 may be removed completely from the seating arrangement when not in use, and may be attached to the seat 1 and/or secondary surface 4 when deployed.

As shown in FIGS. 1a to 1c, the seating arrangement allows a variety of different sitting, reclining and sleeping positions. Removable cushions, pillows, or bolsters may be provided for greater comfort in each of these positions.

FIG. 1a shows the passenger in a sitting position on the middle of the seat 1, facing approximately 40 to 50° to the forward direction, although the passenger may sit closer to the side wall 2b, facing in an approximately forward direction, or closer to the secondary surface 4, in which case the passenger may face in almost any direction, from towards the side wall 2b to towards the secondary surface 4. The space between the seat 1 and the secondary surface 4 is sufficient to allow the passenger's feet to rest on the cabin floor when sitting on the end of the seat 1 closest to the secondary surface 4. The front edge of the seat 1 is curved, to accommodate different seating directions along the width of the seat 1, and the seat back 2a is also curved so as to be approximately parallel to the front edge of the seat 1. Hence, the seating arrangement allows a wide range of different seating positions, unconstrained by armrests or other seat fittings. A seat belt may be arranged to secure the passenger in the middle of the seat 1 and/or in other sitting positions.

FIG. 1b shows the passenger in a lying position, with the infill surface 3 deployed. The passenger's upper body extends along the width of the seat 1 and/or infill surface 3, while the legs extend over the infill surface 3 onto the secondary surface 4. Hence, the passenger's body extends substantially perpendicularly to the sitting direction shown in FIG. 1a. Since the seat 1 is arranged as a single, continuous seat, the passenger may lie comfortably across the width of the seat 1. The seat 1 may be upholstered or otherwise covered with soft material so as to provide a comfortable seating and lying surface. Preferably, there are no armrests to impede the lying position, although optionally one or more armrests may be provided, stowable in the seat back 2a or the seat 1.

FIG. 1c shows the passenger in a relaxing position, reclining along the width of the seat 1 and using the side wall 2b as a back rest. As in the lying position shown in FIG. 1b, the single, continuous seat 1 provides a comfortable extended surface for relaxing in a reclined position.

Seating Arrangement—Second Embodiment

FIGS. 2a to 2g show a second embodiment which is similar to the first embodiment except that the seating arrangement is provided in a seating array, and includes additional advantageous features as described below. The seating array is shown as a longitudinally extending column of seats arranged along a cabin side wall, but aspects of this embodiment may be applied to multiple columns of seats arranged across an aircraft cabin section. Each seat 1 within the column faces outwardly at substantially the same angle towards the cabin side wall.

Adjacent seating arrangements tessellate along the longitudinal column, such that the secondary surface 4 is positioned laterally of the seat 1 of the immediately forward seating arrangement. The seat back 2a reclines slightly backwards so as to overhang part of the immediately rearward seating arrangement, but preferably the angle of reclining is not adjustable. The seat back 2a of the immediately forward seating arrangement is spaced from the front edge of the immediately rearward seat 1, to allow room for the passenger's legs when sitting.

Figure 2C:
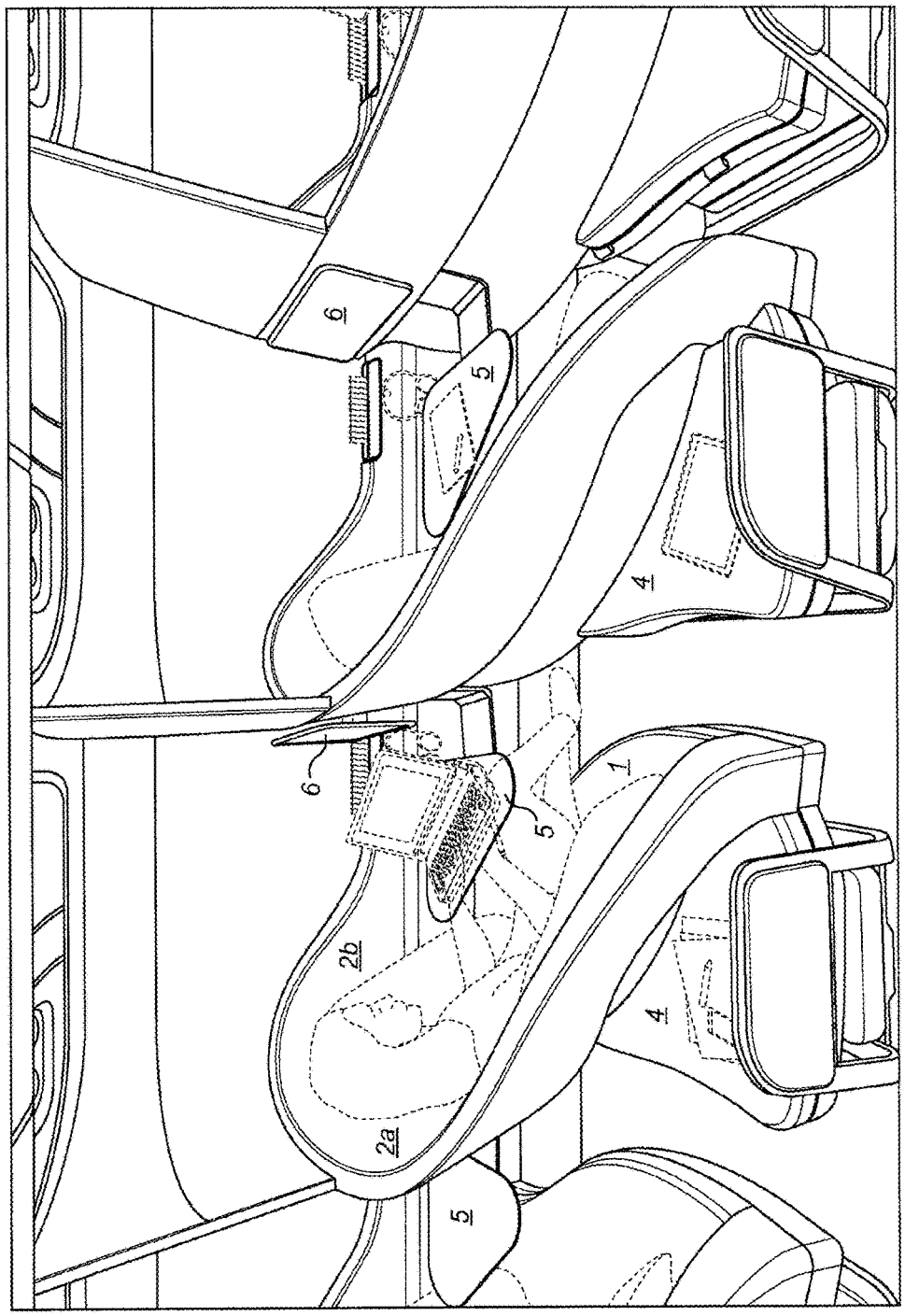
Figure 2D:
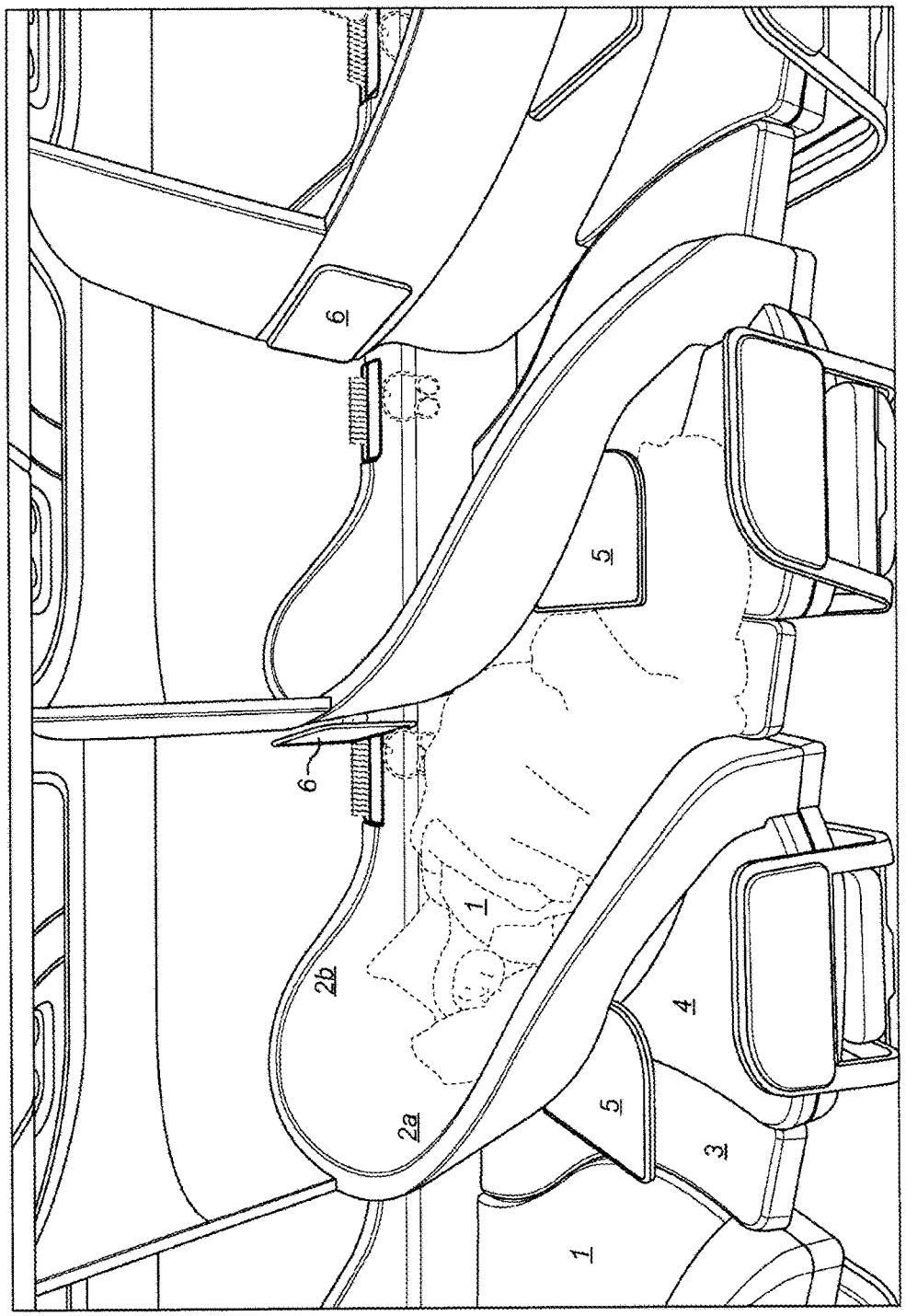
Figure 2E:
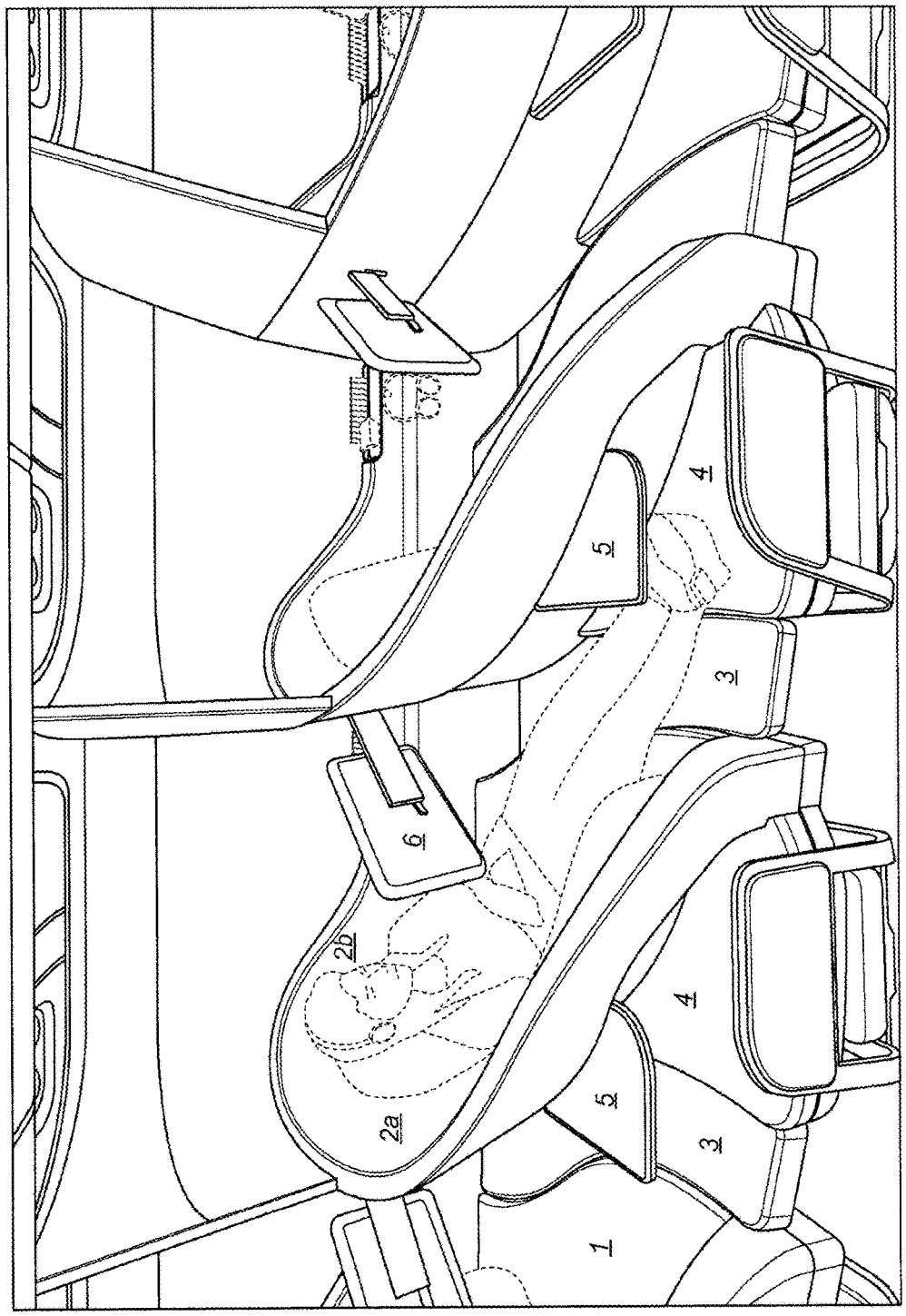
Figure 2F:
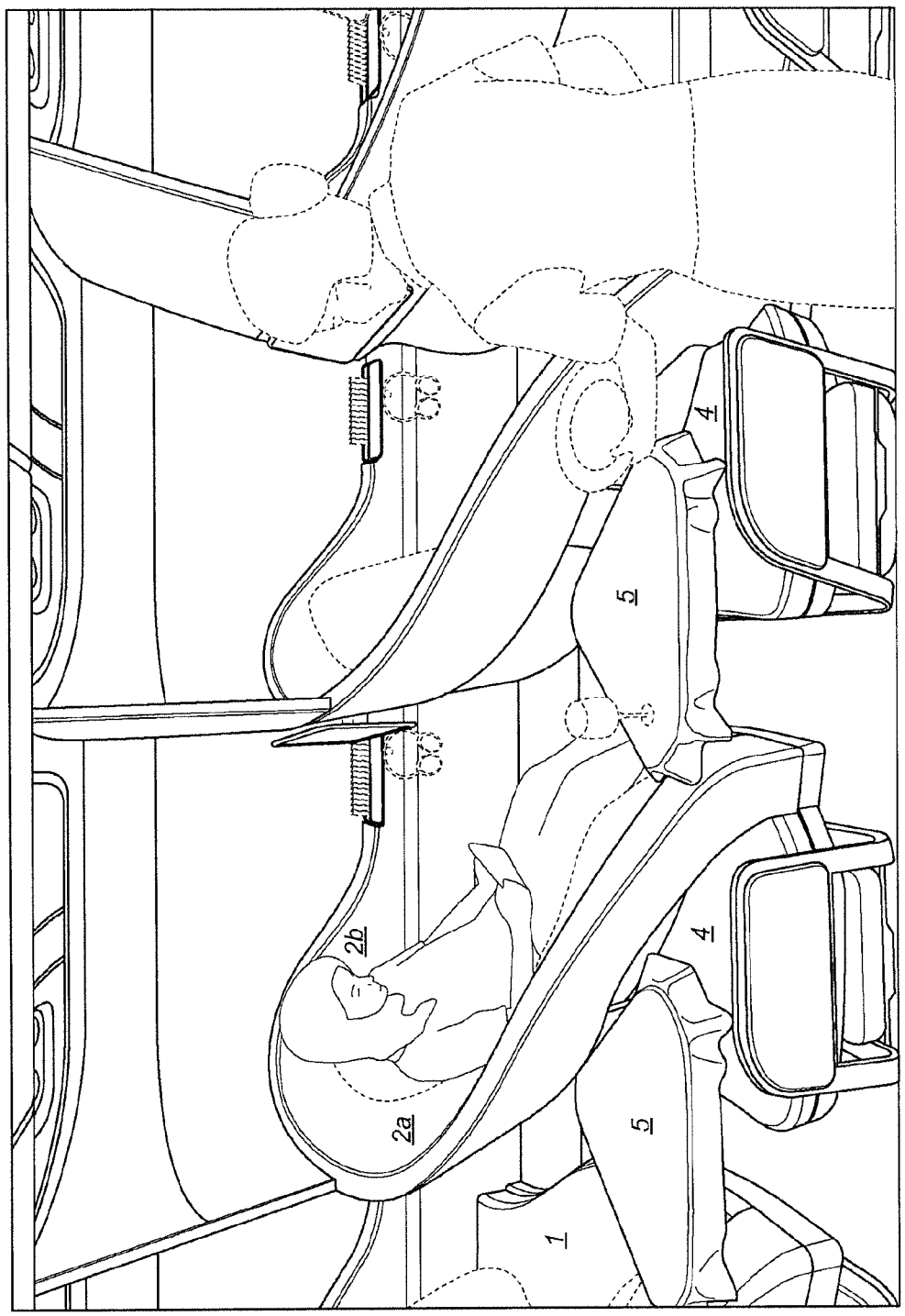
Figure 2G:
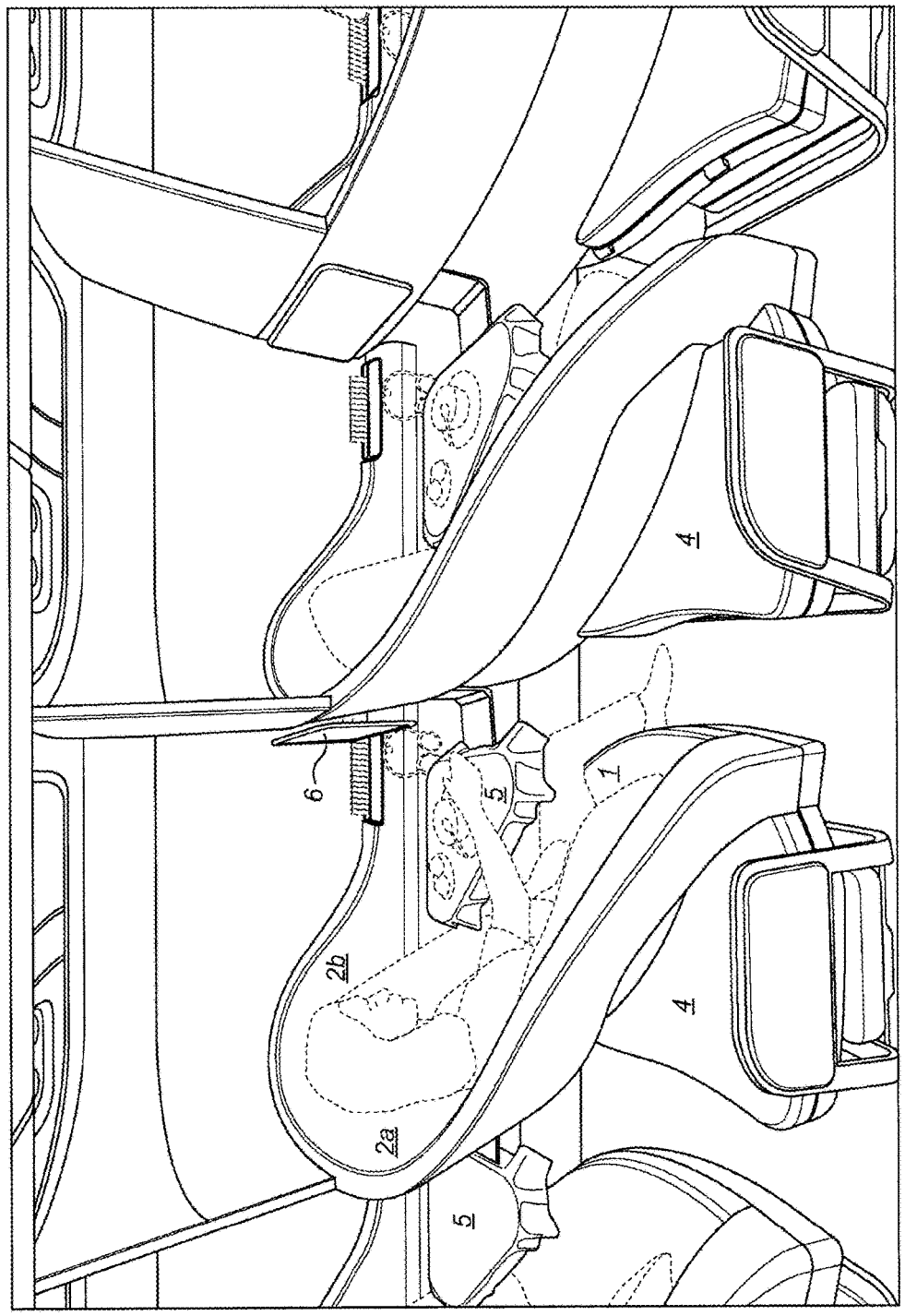

A tray table 5 is moveable laterally between a first position above the secondary surface 4, as shown for example in FIGS. 2a, 2b, 2d, 2e, and 2f, and a second position adjacent the side wall 2b and opposite the seat 1, as shown for example in FIGS. 2c and 2g. Preferably, the tray table 5 is slidably mounted to the back surface of the seat back 2a of the immediately forward seat 1, for example on a sliding track, to allow horizontal movement between the first and second positions. In the first position, the tray table 5 above the secondary surface 4 is generally out of the way of the passenger but is easily accessible from the aisle, for example to facilitate service by cabin crew as shown in FIG. 2f.

Optionally, the tray table 5 is expandable in size, for example by means of a folding or sliding mechanism. In the second embodiment, the tray table 5 is hinged about an axis of reflection such that one half can be folded over onto the other half. FIGS. 2a, 2b, 2d and 2e show the tray table 5 in its folded position, while FIGS. 2c, 2f and 2g show the tray table 5 in its unfolded position.

An IFE (in-flight entertainment) screen 6 is positioned facing the seat 1, adjacent the side wall 2b. The IFE screen 6 is pivotable about a substantially vertical axis so as to be viewable from different positions along the width of the seat 1. The IFE screen 6 may also tilt about a substantially horizontal axis for optimum viewing angle. As shown in FIG. 2e, the IFE screen 6 may be mounted on an arm that pivots about a substantially vertical axis from the seat back 2a of the immediately forward seat.

A shelf 7 or cocktail tray is positioned on or adjacent to the side wall 2b, forward of the seat 1. The shelf 7 is of a size and shape to carry drinks, pens and the like.

Various different configurations or uses of the seating arrangement will now be described. In a TTL configuration shown in FIG. 2b, the passenger sits upright on the seat 1, resting against the seat back 2a. As best shown in FIG. 2a, a seat belt is provided so as to secure the passenger when seated in this position. The tray table is moved to the second position, so as not to present a hazard to the passenger.

In a working configuration shown in FIG. 2c, the tray table 5 is moved to the first position, and may be unfolded, for use as a work surface.

In a rest/sleeping position shown in FIG. 2d, the infill surface 3 is deployed and the passenger lies along the sleeping surface, comprising the seat 1, infill surface 3 and secondary surface 4. The tray table 5 is moved out of the way, to the second position, and may be folded.

In the relaxing position shown in FIG. 2e, the passenger sits up against the corner between the seat back 2a and the side wall 2b, supported by a pillow or cushion. The IFE screen 6 is rotated to face the passenger. The tray table 5 may be moved out of the way, to the second position, although could be moved to the first position to hold a magazine, laptop or tablet computer, for example.

In the service position shown in FIG. 2f, the tray table 5 is moved to the second position so as to be accessible from the aisle, so that it may be laid for a meal by cabin crew. In the dining position shown in FIG. 2g, the tray table 5 is moved to the first position, so that the passenger may eat their meal in the sitting position.

Various other positions and configurations are possible within the scope of the second embodiment.

Personal Storage

Figure 3:
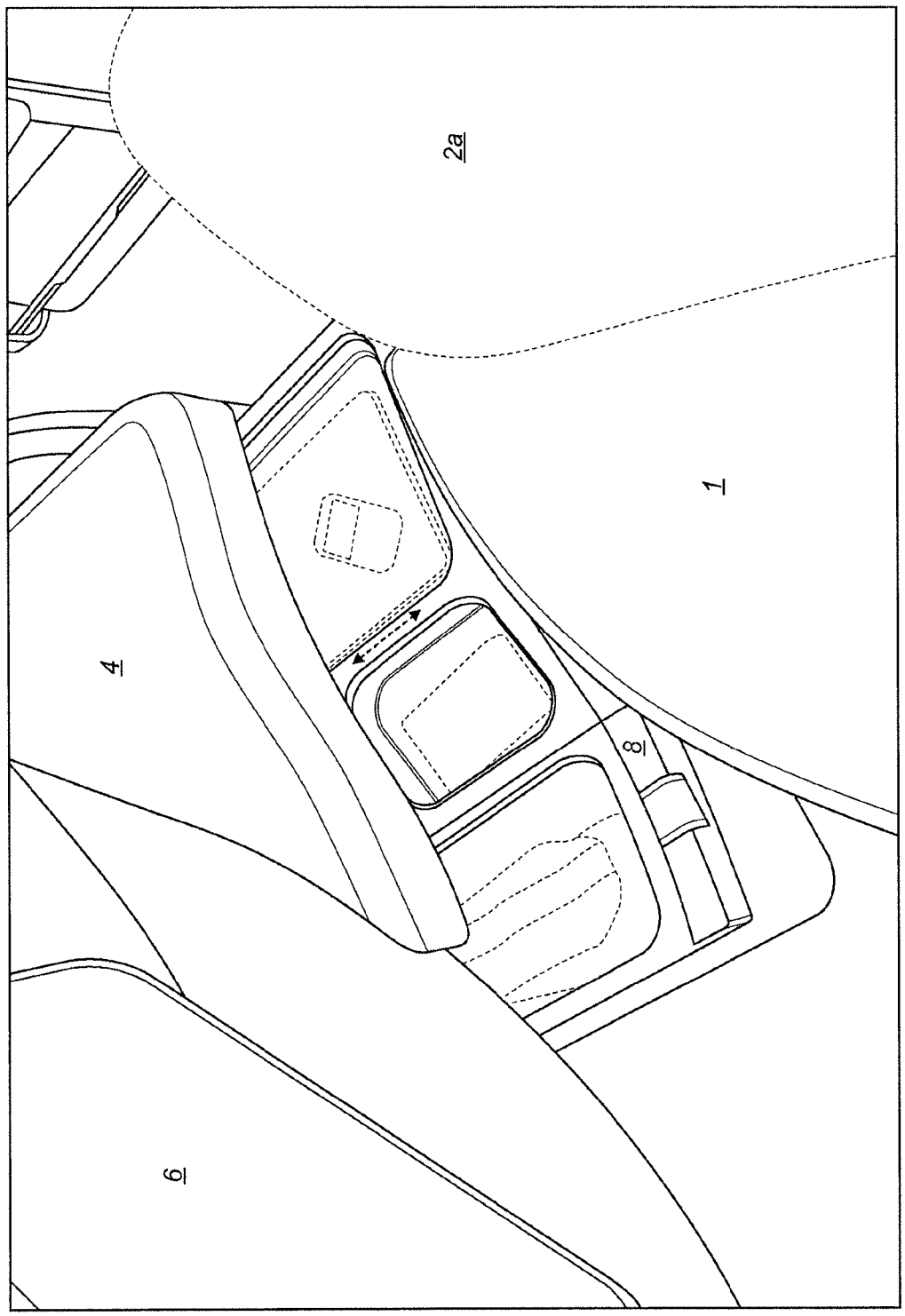
FIG. 3 is a perspective view of a personal stowage compartment for use in any of the embodiments.

As shown in FIG. 3, a personal storage drawer 8 may be provided under the secondary surface 4. The drawer 8 may slide out from under the secondary surface 4 towards the seat 1, as shown by the dashed arrow, so that the drawer is accessible in the gap between the seat 1 and the secondary surface 4. The drawer 8 may include one or more compartments for housing personal items, such as shoes, a laptop computer, and/or a smartphone.

Further storage means, such as storage drawers, cupboards, or shelves, may be provided under the seat 1. Since no reclining mechanism is provided, and the underside of the seat 1 is accessible along its width, a much larger volume of storage can be provided than in conventional aircraft seats.

Double Seating Arrangement

Figure 4:
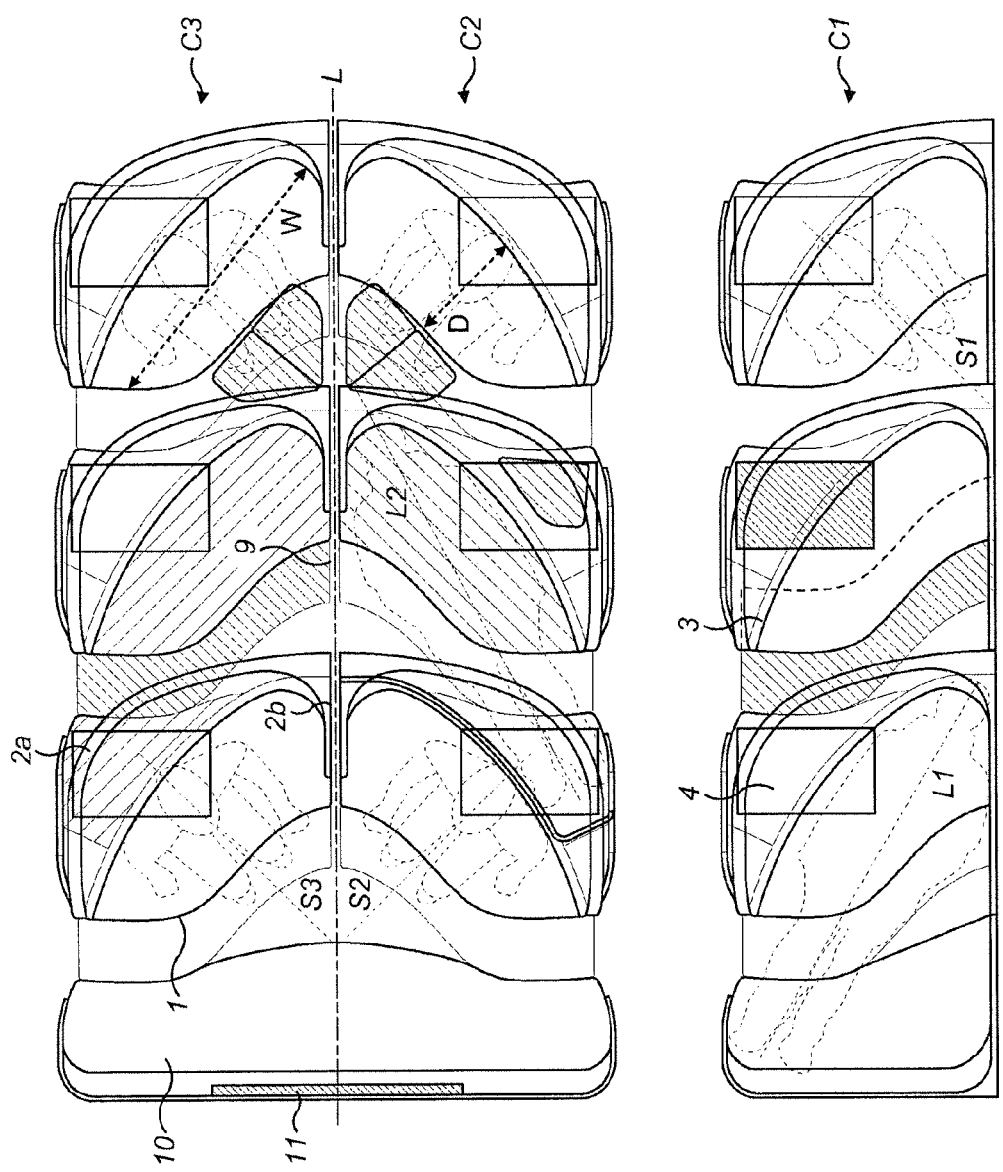
FIG. 4 is a schematic plan view of an array of aircraft passenger seats in the second embodiment.

FIG. 4 shows a seating array comprising a side column C1 of seating arrangements adjacent the cabin sidewall and two adjacent central columns C2, C3. Column C1 is substantially as in the second embodiment, while the seating arrangements of columns C2 and C3 are mirror images about the longitudinal plane of the cabin, so that the seats 1 of the seating arrangements of columns C2 and C3 respectively face inwards towards each other and are aligned in the longitudinal or row direction. The seating arrangements of columns C1 may also be aligned in the longitudinal direction with those of columns C2 and C3. The seat pitch (i.e. longitudinal spacing of seating arrangements) is 43 inches (1092 mm). The length of the sleeping surface in columns C2 and C3 is 74.47 inches (1881 mm) and the width of the sleeping surface is 26.3 inches (668 mm).

FIG. 4 illustrates the width W and depth D of sample seats in columns C2 and C3. In this embodiment, the width W is approximately 50 inches (1.25 meters) and the depth D is approximately 20 inches (0.5 meters).

Figure 5:
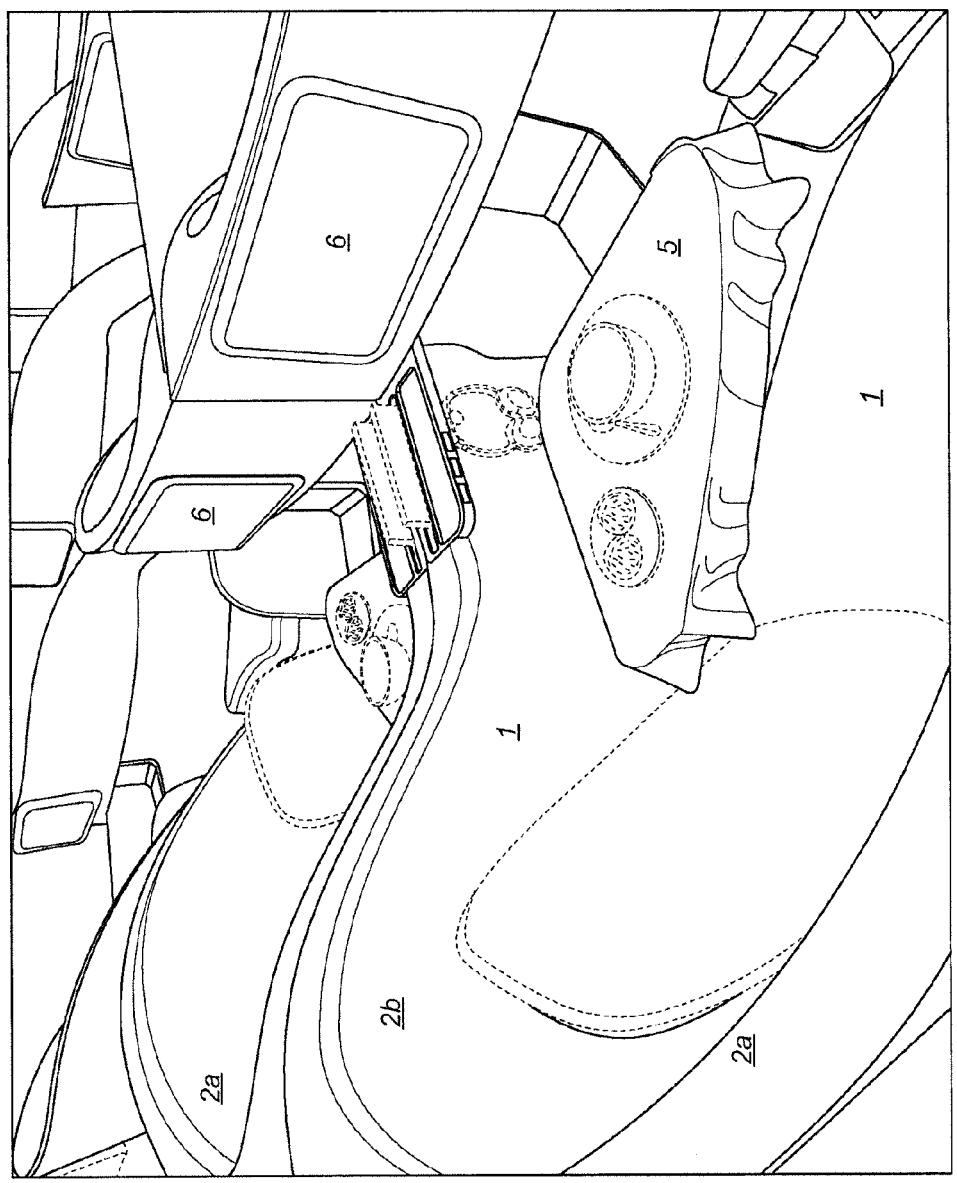
FIG. 5 is a perspective view of a pair of aircraft passenger seating arrangements in the second embodiment, in a double dining configuration.

A privacy screen 9 may be provided between laterally adjacent seats of the second and third columns C2, C3. The privacy screen 9 may be retractable between the side walls 2b of the laterally adjacent seating arrangements, for example by sliding, to form a double seating arrangement in which the occupants of the laterally adjacent seating arrangements may converse with each other. The tray tables 5 of the double seating arrangement may be moved to their first positions so that the occupants may dine together. FIG. 5 shows such a double dining arrangement in a perspective view.

The front seating arrangements in each column C1, C2, C3, have additional forward space as they are not required to tessellate with a forward seating arrangement. This space may be occupied by a substantially horizontal surface and/or storage, such as a double ottoman 10, spanning both central columns C2, C3. A double-width IFE screen 11 may be provided, spanning both central columns C2, C3, to provide a larger viewing screen or private cinema for the occupants of the double seat. In this example, a diagonal screen size of approximately 40 inches (1 meter) may be accommodated.

FIG. 4 shows, in plan view, passengers in sitting and lying positions. In column C1, a sitting passenger faces outwardly, towards the cabin wall, at an angle S1 of approximately 40° to the cabin sidewall, which is substantially parallel to the longitudinal direction L of the aircraft cabin. A lying passenger's body extends inwardly, away from the cabin sidewall, at an angle L1 of approximately 30° to the cabin sidewall.

In columns C2 and C3, passengers face inwards in a sitting position facing at a respective angle S2, S3 of approximately 45° to the longitudinal direction of the aircraft cabin. A lying passenger's body extends outwardly, towards the cabin sidewall, at a respective lying angle L2, L3 of approximately 30° to the longitudinal direction L of the aircraft cabin.

The above angles are only approximate, in that they depend to some extent on the preferred sitting and lying positions of the passengers, and also depend on the pitch and width of the seating arrangements. The range of seating angles S1, S2 and S3 may be 30° to 60°, and preferably 40° to 50°. The range of lying angles L1, L2 and L3 may be 20° to 50°, and preferably 30° to 40°.

Alternative Seating Arrays

FIGS. 6a and 6b show seating arrays of the second embodiment, for different aircraft cabins. The array shown in FIG. 6a is intended for the main deck of Boeing® 777 and 747 and Airbus® A380 aircraft. The pitch (i.e. longitudinal spacing of seating arrangements) is 42 inches (1067 mm) and the width (i.e. lateral width of the seating arrangement) is 47.28 inches (1201 mm) for column C1 and 48.76 inches (1238 mm) for columns C2 and C3. The aisle width is 17.5 inches (445 mm). The lying angle L1 is approximately 35°.

The array shown in FIG. 6b is intended for the upper deck of Boeing® 787 and Airbus® A350 and A380 aircraft. The pitch is 43 inches (1092 mm) and the width (i.e. lateral width of the seating arrangement) is 43.77 inches (1112 mm) for column C1 and 44.51 inches (1131 mm) for columns C2 and C3. The aisle width is 17.5 inches (445 mm). The lying angle L1 is approximately 35°.

Hence, the pitch and width of the seating arrangements may vary depending on the dimensions of the aircraft cabin. The ratio of the pitch to the width, and therefore the angle at which the sleeping surface extends, may also vary.

Layout

Figure 7:
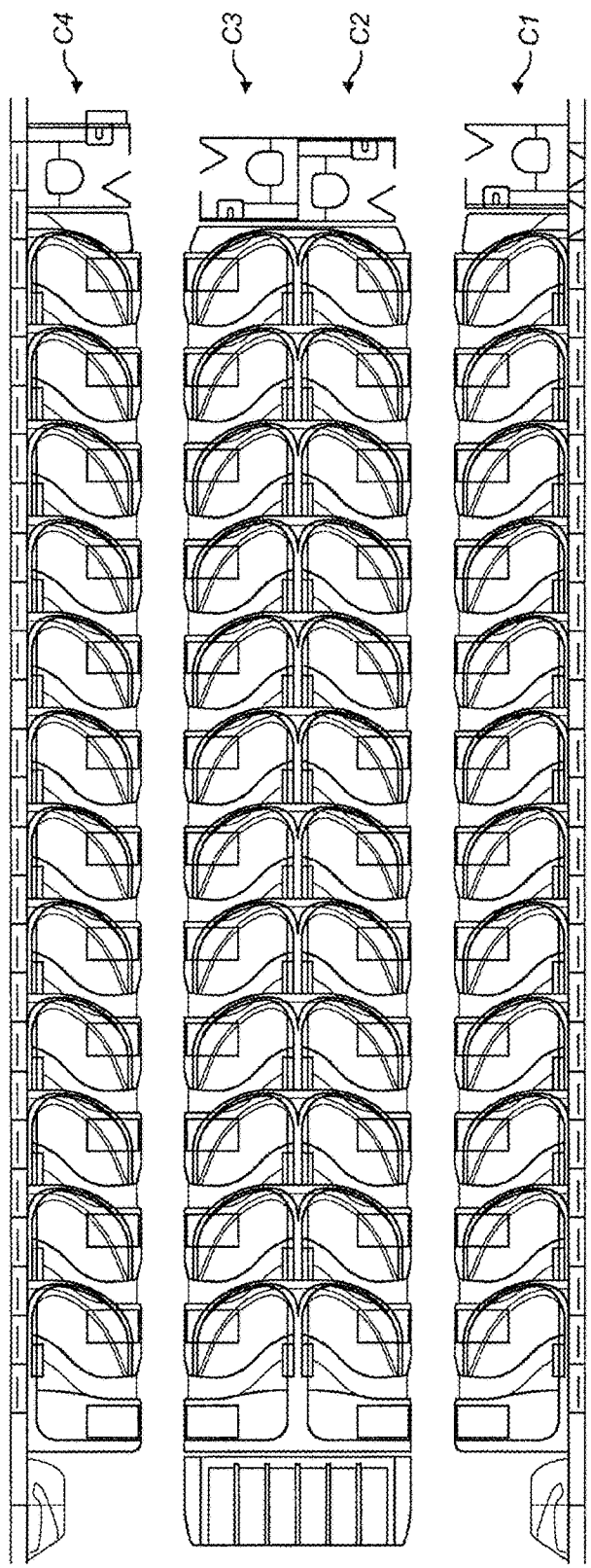
FIG. 7 is a schematic plan view of a layout of aircraft passenger seats of the second embodiment, occupying an aircraft cabin section.

FIG. 7 shows a LOPA (Layout of Passenger Accommodation) of seating arrangements of the second embodiment, in an aircraft cabin section. The seating arrangements are arranged in four columns C1 to C4, each comprising 12 seating arrangements. The seating arrangements of the two central columns C2, C3 face inwardly towards each other, and may be configured as double seating arrangements as described above. The seating arrangements of the outer columns C1, C4 face outwardly towards their adjacent cabin sidewalls. Aisles A1, A2 are provided between columns C1 and C2, and between columns C3 and C4. As shown in FIG. 7, a galley may be provided at one end of the cabin section, and lavatory cubicles may be provided at the other end.

Seating Arrangement—Third Embodiment

Figure 8A:
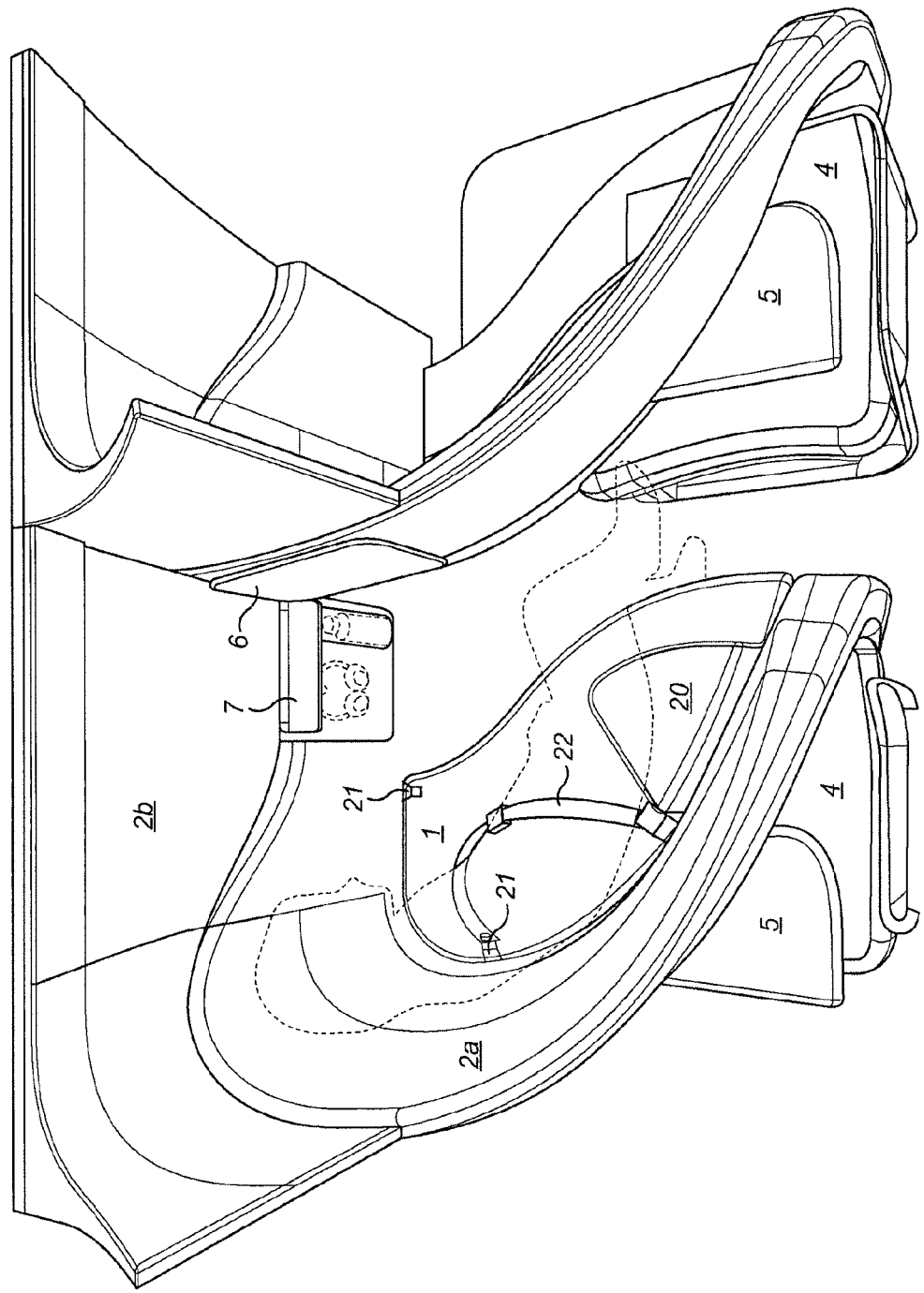
FIGS. 8a and 8b are perspective views of a passenger seating arrangement in a third embodiment, respectively in sitting and lying configurations.
Figure 8B:
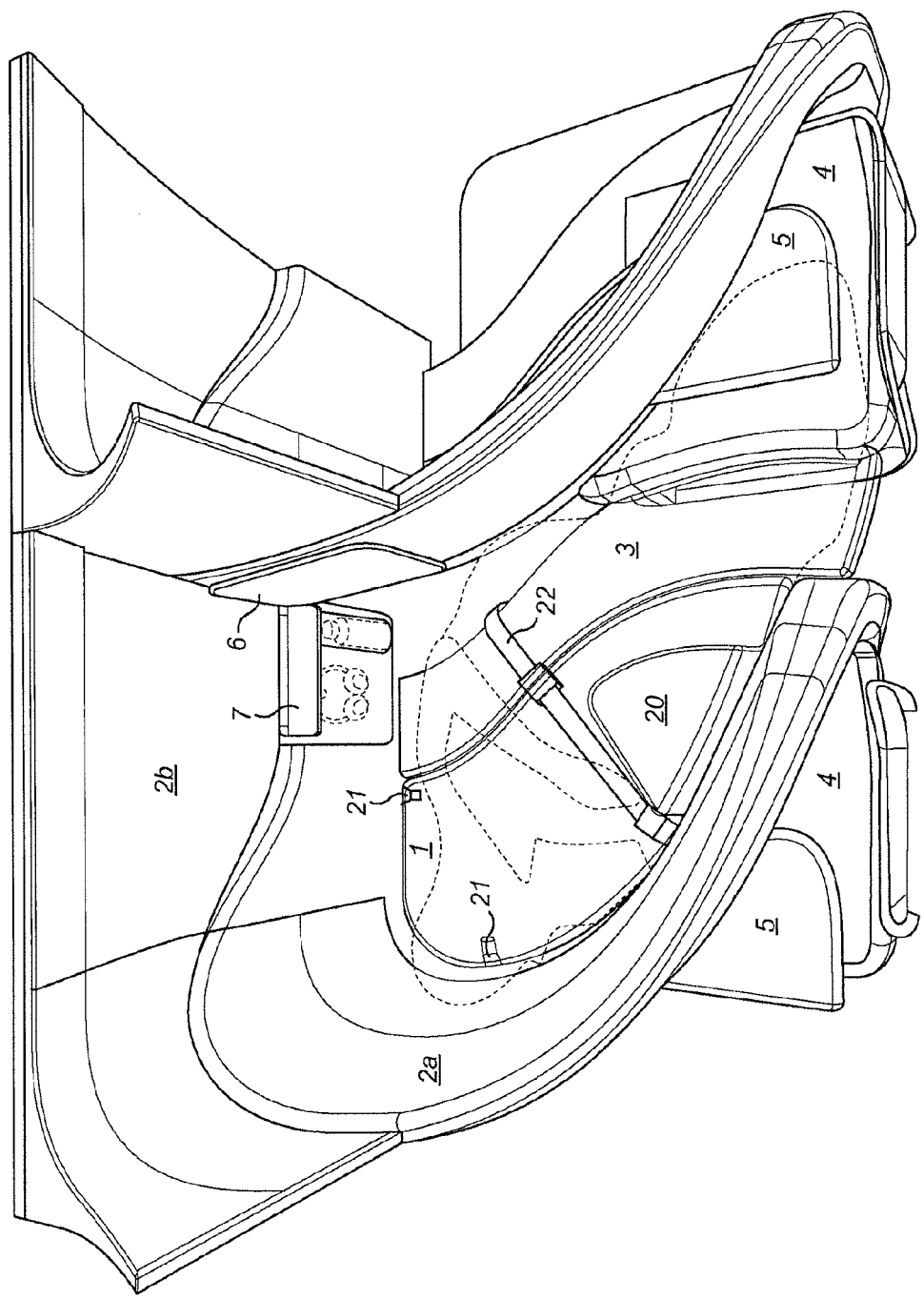

FIGS. 8a and 8b show a third embodiment which is similar to the second embodiment except that an arm rest 20 is provided to one side of the seat 1, towards the secondary surface 4. The arm rest 20 is retractable so that its upper surface is substantially coplanar with the upper surface of the seat 1. When deployed, the arm rest 20 rises up in a substantially horizontal direction from the seat 1, supported by a deployment mechanism provided under the seat 1. The arm rest 20 provides comfort in the sitting position shown in FIG. 8a, and encourages the passenger to face approximately forward in a TTL position. The arm rest 20 is wider than a conventional armrest and may be approximately triangular in plan.

A lap belt 22 may be attached to any one of a plurality of different fixing points 21, so as to provide restraint for a passenger in different sitting positions, such as that shown in FIG. 8a, or lying positions, such as shown in FIG. 8b. A fixing point 21 may be provided on the infill surface 3 for this purpose.

Figure 9:
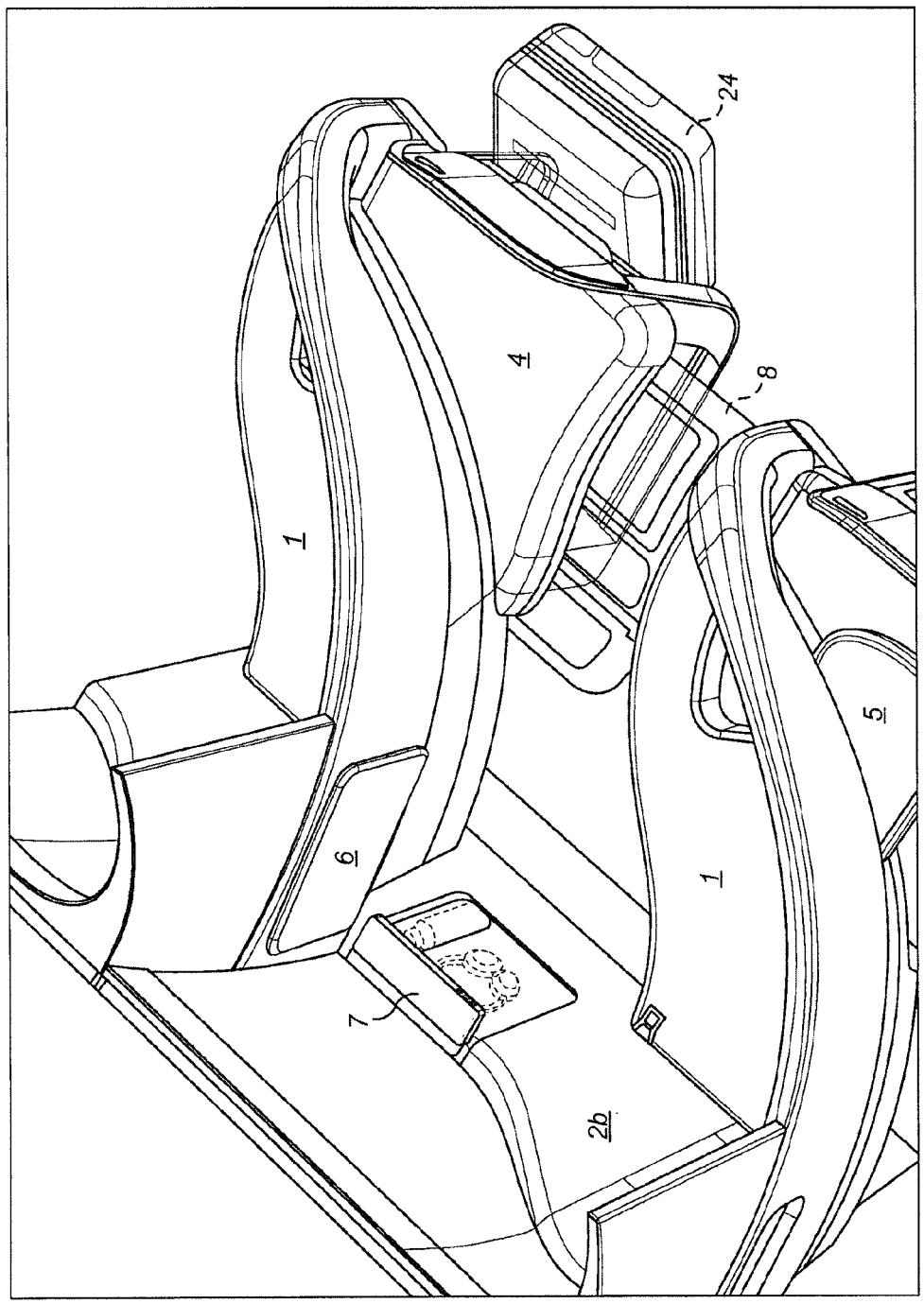
FIG. 9 is a perspective view of the passenger seating arrangement of the third embodiment showing storage areas under a secondary surface.

As shown in FIG. 9, a storage drawer 8 may be provided under the secondary surface 4, similar to that in the second embodiment. Additionally, sufficient space may be provided under the secondary surface 4 to allow cabin baggage 24 to be slid underneath. A moveable retention member (not shown), may be provided so as to prevent the cabin baggage 24 from sliding out during the flight. The retention member may comprise a retention bar operable by pressing down with the foot.

Figure 10:
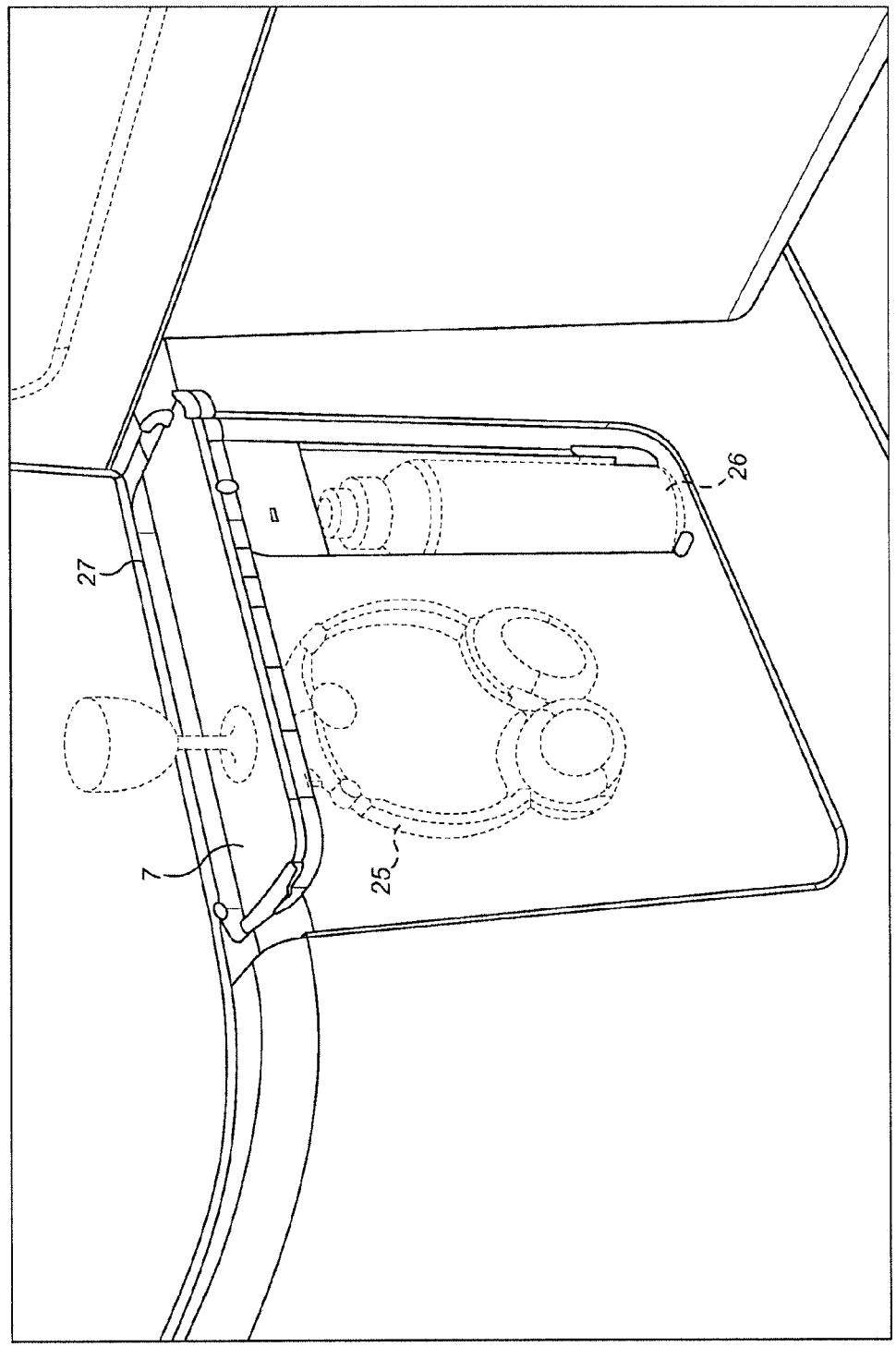
FIG. 10 is a perspective view of facilities adjacent a side wall of the passenger seating arrangement of the third embodiment.

As shown in FIG. 10, additional facilities may be provided under the shelf 7, such as a headphone hanger 25, drinks bottle holder 26, and magazine/safety card slot 27.

Figure 11:
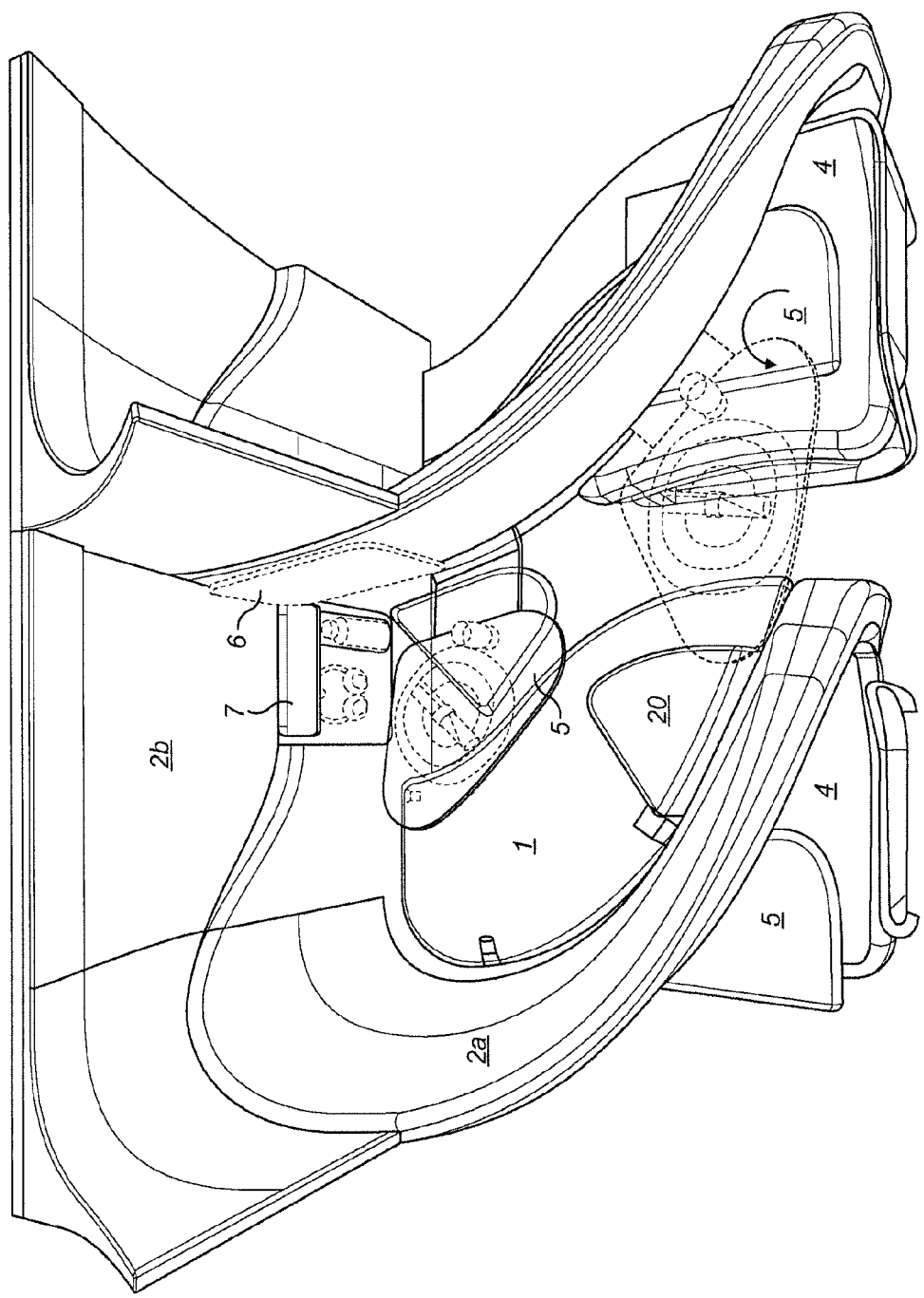
FIG. 11 the passenger seating arrangement of the third embodiment showing different positions and configurations of a tray table.

As shown in FIG. 11, the tray table 5 may slide between the first and second positions, and may be unfolded to provide a larger area, as in the second embodiment.

Figure 12A:
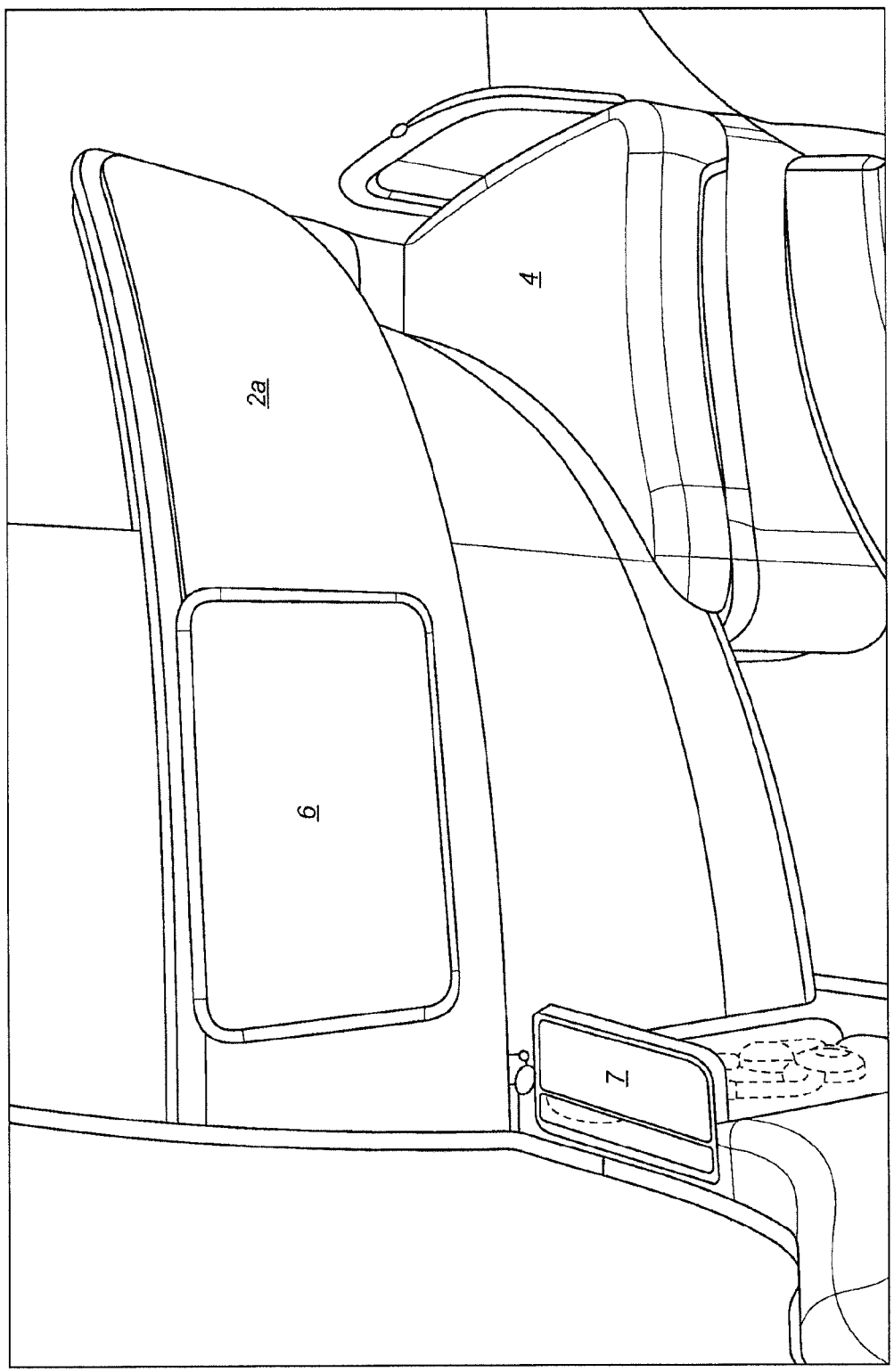
FIGS. 12a and 12b are perspective views showing an WE screen in the passenger seating arrangement of the third embodiment, respectively in stowed and deployed positions.
Figure 12B:
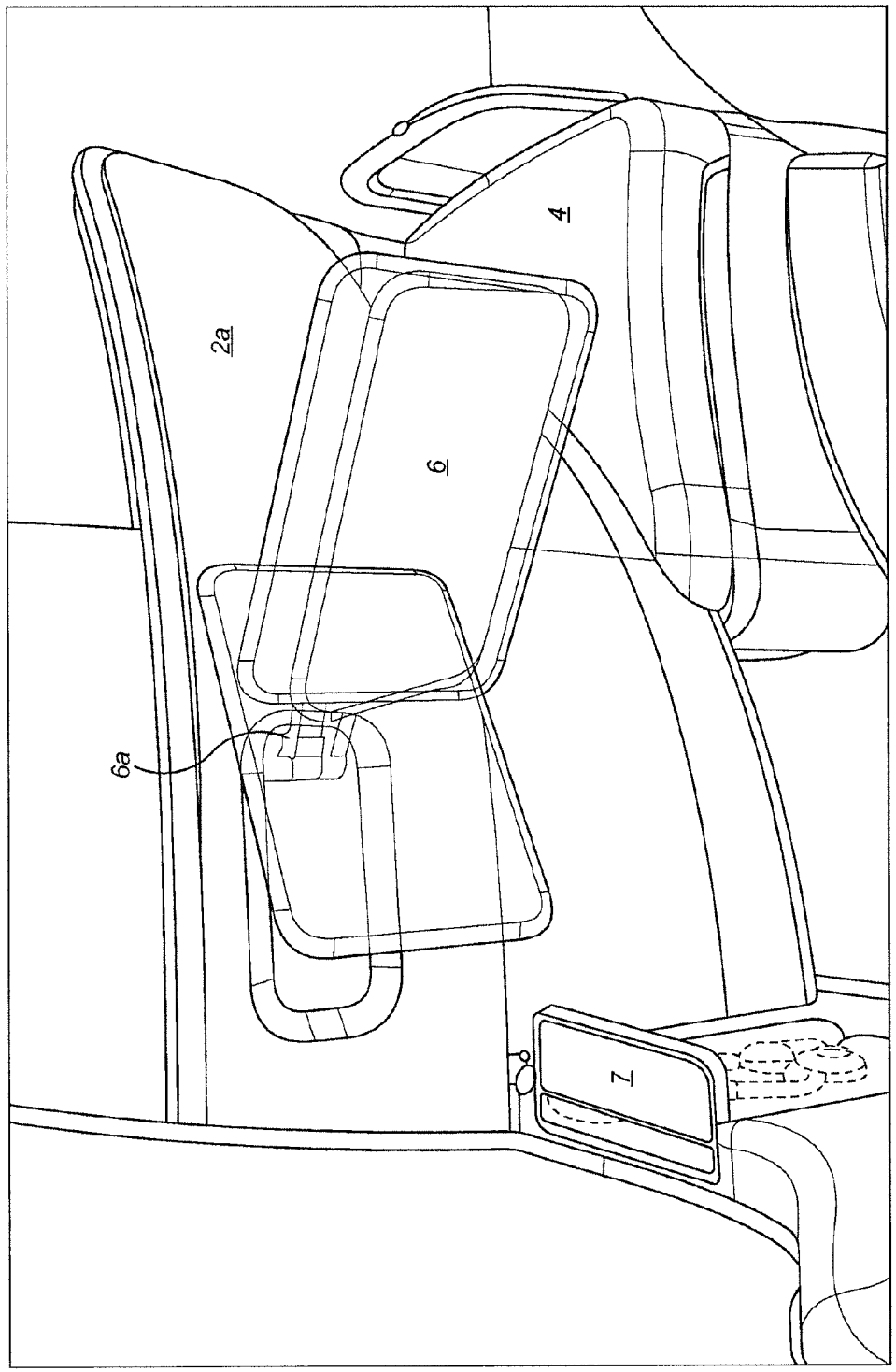

FIGS. 12a and 12b show the IFE screen 6 pivotable about a substantially vertical axis so as to be viewable from different positions along the width of the seat 1, on an arm 6a that pivots about a substantially vertical axis from the seat back 2a of the immediately forward seat.

The third embodiment may be arranged in arrays or layouts similar to those described above with reference to the second embodiment.

Alternative Embodiments

Alternative embodiments of the invention may be apparent from reading the above description. Such alternative embodiments may nevertheless fall within the scope of the present invention.

The invention claimed is:

1. A passenger seating arrangement for an aircraft cabin, the arrangement comprising:
 a seat having a width substantially greater than its depth, the seat having a seat back;
 a secondary surface arranged to one side of the seat in a direction substantially parallel to the width of the seat; and
 an infill surface deployable into a space between the seat and the secondary surface so as to form a substantially continuous sleeping surface along the secondary surface, the infill surface, and the width of the seat;
 wherein a front end of the seat is curved, to accommodate different seating positions in different directions along the width of the seat; and wherein the seat has a depth tapering in a direction towards the secondary surface.

2. The passenger seating arrangement of claim 1, wherein an upper surface of the seat and the secondary surface are substantially coplanar.

3. The passenger seating arrangement of claim 1, wherein the infill surface, when deployed into the space between the seat and the secondary surface, is substantially coplanar with an upper surface of the seat and the secondary surface.

4. The passenger seating arrangement of claim 1, wherein the infill surface, when deployed into the space between the seat and the secondary surface, extends along a front end of the seat so as to increase the depth thereof.

5. The passenger seating arrangement of claim 1, wherein the infill surface is stowable under the seat.

6. The passenger seating arrangement of claim 5, wherein the infill surface is connected to the seat via a deployment mechanism enabling deployment of the infill surface into the space between the seat and the secondary surface.

7. The passenger seating arrangement of claim 1, including a lap belt having a plurality of different fixing points for providing passenger restraint in a plurality of different sitting and/or lying positions.

8. The passenger seating arrangement of claim 1, including an arm rest arranged within the seat and retractable so as to be substantially coplanar with an upper surface of the seat.

9. The passenger seating arrangement of claim 8, wherein the arm rest is arranged at a side of the seat.

10. The passenger seating arrangement of claim 8, wherein the arm rest is substantially triangular in plan.

11. The passenger seating arrangement of claim 1, wherein the seat back is substantially fixed.

12. The passenger seating arrangement of claim 11, wherein the seat back is curved along the width of the seat.

13. The passenger seating arrangement of claim 1, including a tray table moveable horizontally between a first position away from the seat and a second position opposite the seat.

14. The passenger seating arrangement of claim 13, wherein the tray table is variable in size.

15. The passenger seating arrangement of claim 14, wherein the tray table is foldable about an axis of reflection symmetry thereof.

16. The passenger seating arrangement of claim 1, including an IFE screen pivotable about a substantially vertical axis so as to be viewable from different positions along the width of the seat.

17. The passenger seating arrangement of claim 16, wherein the IFE screen is mounted on an arm pivotable about a substantially vertical axis.

18. The passenger seating arrangement of claim 1, including a side wall arranged at a side of the seat.

19. The passenger seating arrangement of claim 18, wherein the direction of the width of the seat is aligned at an angle of approximately 30-50° to the side wall.

20. An array of passenger seating arrangements each comprising:
a seat having a width substantially greater than its depth, the seat having a seat back, and
a secondary surface arranged to one side of the seat,
wherein a front end of the seat is curved, to accommodate different seating positions in different directions along the width of the seat;
wherein the array comprises at least one column of said seating arrangements aligned along a longitudinal direction, such that the seat of each seating arrangement in the column faces at substantially the same seating angle to the longitudinal direction; and
wherein the secondary surface of a first one of said passenger seating arrangements is positioned laterally of a seat of a second one of the passenger seating arrangements immediately forward of the first one of the passenger seating arrangements.

21. The array of claim 20, wherein the seating angle is in the range 30° to 60°.

22. The array of claim 21, wherein the seating angle is in the range 40° to 50°.

23. The array of claim 20, wherein adjacent ones of said seating arrangements are tessellated along the column.

24. The array of claim 20, wherein a seat back of one said seating arrangement overhangs a space in front of the seat of another, immediately rearward seating arrangement.

25. The array of claim 21, wherein the depth of the seat tapers in a direction towards said secondary surface.

26. The array of claim 22, wherein each seating arrangement includes an infill surface deployable into a space between the seat and the secondary surface so as to form a substantially continuous sleeping surface along the secondary surface, the infill surface and the width of the seat.

27. The array of claim 23, wherein each seating arrangement includes a moveable surface deployable along a front end of the seat so as to increase the depth thereof.

* * * * *

UNITED STATES PATENT AND TRADEMARK OFFICE
CERTIFICATE OF CORRECTION

Page 1 of 1

PATENT NO. : 10,435,158 B2
APPLICATION NO. : 15/110092
DATED : October 8, 2019
INVENTOR(S) : Nigel Goode It is certified that error appears in the above-identified patent and that said Letters Patent is hereby corrected as shown below:

In the Specification

Column 3, Line 4, delete "WE" and insert --IFE-- therefor.

Signed and Sealed this
Seventh Day of January, 2020

Andrei Iancu
*Director of the United States Patent and Trademark Office*